US010091343B2

United States Patent
Torres et al.

(10) Patent No.: US 10,091,343 B2
(45) Date of Patent: Oct. 2, 2018

(54) MOBILE DEVICE AND METHOD FOR DETERMINING ITS CONTEXT

(71) Applicant: NXP B.V., Eindhoven (NL)

(72) Inventors: Rafael Torres, Antibes (FR); Daniele Battaglino, Juan les pins (FR); Ludovick Lepauloux, Cannes (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/710,570

(22) Filed: Sep. 20, 2017

(65) Prior Publication Data
US 2018/0091638 A1 Mar. 29, 2018

(30) Foreign Application Priority Data
Sep. 28, 2016 (EP) .................................. 16306245

(51) Int. Cl.
*H04M 1/60* (2006.01)
*H04W 4/02* (2018.01)
*H04W 48/04* (2009.01)
*G10L 25/48* (2013.01)
*H04W 52/02* (2009.01)
*H04W 64/00* (2009.01)
*H04M 1/725* (2006.01)
*H04W 24/00* (2009.01)

(52) U.S. Cl.
CPC .......... *H04M 1/6091* (2013.01); *G10L 25/48* (2013.01); *H04M 1/72569* (2013.01); *H04W 4/027* (2013.01); *H04W 48/04* (2013.01); *H04W 52/0251* (2013.01); *H04W 64/006* (2013.01); *H04M 1/6008* (2013.01); *H04M 1/6075* (2013.01); *H04M 1/72577* (2013.01); *H04W 24/00* (2013.01)

(58) Field of Classification Search
USPC ................................ 455/569.2, 550.1, 575.1
See application file for complete search history.

(56) References Cited

U.S. PATENT DOCUMENTS

| 9,078,116 | B2 | 7/2015 | Abramson et al. |
| 9,107,093 | B2 | 8/2015 | Aksamit |
| 2002/0128000 | A1 | 9/2002 | do Nascimento, Jr. |
| 2003/0197597 | A1 | 10/2003 | Bahl et al. |
| 2012/0059780 | A1 | 3/2012 | Kononen et al. |
| 2014/0156659 | A1* | 6/2014 | Grokop ............. H04M 1/72563 707/737 |

(Continued)

OTHER PUBLICATIONS

Pettunen, Mikko et al; "An Implementation of Auditory Context Recognition for Mobile Devices"; 2009 Tenth International IEEE Conference on Mobile Data Management Systems, Services and Middleware, Taipei; pp. 424-429 (2009).

(Continued)

*Primary Examiner* — Fayyaz Alam (57) ABSTRACT

According to a first aspect of the present disclosure, a mobile device is provided, comprising: a motion sensor configured to detect one or more movements of the mobile device; an audio sensor configured to capture one or more audio signals; a processing unit configured to determine a context of the mobile device in dependence on at least one movement detected by the motion sensor and at least one audio signal captured by the audio sensor. According to a second aspect of the present disclosure, a corresponding method for determining a context of a mobile device is conceived. According to a third aspect of the present disclosure, a corresponding computer program is provided.

13 Claims, 4 Drawing Sheets

(56) References Cited

U.S. PATENT DOCUMENTS

| | | | | |
|---|---|---|---|---|
| 2014/0206416 | A1* | 7/2014 | Aurongzeb | H04R 29/008 |
| | | | | 455/566 |
| 2015/0112678 | A1 | 4/2015 | Binks | |
| 2015/0301581 | A1* | 10/2015 | Ding | G06F 1/3206 |
| | | | | 713/320 |
| 2016/0217670 | A1* | 7/2016 | Kay | G08B 21/0492 |
| 2016/0381658 | A1* | 12/2016 | Ghosh | H04L 67/22 |
| | | | | 455/458 |
| 2017/0353829 | A1* | 12/2017 | Kumar | H04W 4/021 |

OTHER PUBLICATIONS

Räsänen, Okko et al; "Comparison of Classifiers in Audio and Acceleration Based Context Classification in Mobile Phones"; 19th IEEE European Signal Processing Conference, Barcelona; pp. 946-950 (2011).

Transfeld, P. et al; "Towards Acoustic Event Detection for Surveillance in Cars"; Speech Communication; 11 ITG Symposium; Proceedings of, Erlangen, DE; IEEE pp. 1-4 (2014).

Chen, Tao et al; "Content and Context Information Fusion for Mobile Landmark Recognition"; Information, Communications and Signal Processing, 2011 8th International Conference on; Singapore; pp. 1-4 (2011).

Chen, Tao et al; "Integrated Content and Context Analysis for Mobile Landmark Recoginition"; IEEE Transactions on circuits and Systems for Video Technology, vol. 21, No. 10; pp. 1476-1486 (Oct. 2011).

Eronen, Antti J. et al; "Audio-Based Context Recognition"; IEEE Transactions on Audio, Speech and Language Processing, vol. 14, No. 1; pp. 321-329 (Jan. 2006).

* cited by examiner

MOBILE DEVICE AND METHOD FOR DETERMINING ITS CONTEXT

FIELD

The present disclosure relates to a mobile device. Furthermore, the present disclosure relates to a method for determining the context of a mobile device, and to a corresponding computer program.

BACKGROUND

Today, mobile devices such as smart phones are used in a wide variety of environments. In some environments (i.e., contexts) it may be desirable to automatically configure a mobile device for a particular use. For example, if the mobile device enters a vehicle, it may be desirable that the mobile device enters into a safe-driving mode in which the device's user interface is easier to use and in which certain functions of the device are disabled. However, in order to enter automatically into such a mode, the context of the device should also be determined automatically. Furthermore, it is desirable to determine said context in a reliable manner.

SUMMARY

According to a first aspect of the present disclosure, a mobile device is provided, comprising: a motion sensor configured to detect one or more movements of the mobile device; an audio sensor configured to capture one or more audio signals; a processing unit configured to determine a context of the mobile device in dependence on at least one movement detected by the motion sensor and at least one audio signal captured by the audio sensor.

In one or more embodiments, the processing unit is configured to use the captured audio signal for determining said context only if the detected movement indicates that said context is probable.

In one or more embodiments, the processing unit is configured to classify the detected movement and to determine whether said context is probable using a result of classifying the detected movement.

In one or more embodiments, the processing unit is configured to use a machine-learning algorithm for determining the context.

In one or more embodiments, the processing unit is configured to use a finite state machine for classifying the detected movement.

In one or more embodiments, the motion sensor includes at least one of: an accelerometer, a gyroscope, a compass, a barometer, a gravimeter.

In one or more embodiments, the context comprises an acoustic portion, and the processing unit is configured to use an acoustic context classifier for determining the acoustic portion of the context.

In one or more embodiments, the processing unit is configured to use a voting processing over time for determining the most probable context.

In one or more embodiments, the processing unit is configured to use a release timer for avoiding a rapid switch between different contexts.

In one or more embodiments, the context comprises an audio event, and the processing unit is configured to use an audio event detection classifier for determining said audio event.

In one or more embodiments, the context is a vehicle or a building.

In one or more embodiments, the processing unit is configured to classify motion data and audio data independently from each other, and to merge the classification results in order to determine the context.

According to a second aspect of the present disclosure, a method for determining a context of a mobile device is conceived, comprising: detecting, by a motion sensor of the mobile device, at least one movement of the mobile device; capturing, by an audio sensor of the mobile device, at least one audio signal; determining, by a processing unit of the mobile device, said context in dependence on the detected movement and the captured audio signal.

According to a third aspect of the present disclosure, a computer program product is provided comprising executable instructions which, when executed, carry out or control a method of the kind set forth.

In one or more embodiments, a non-transitory machine-readable medium comprises a computer program of the kind set forth.

DESCRIPTION OF DRAWINGS

Embodiments will be described in more detail with reference to the appended drawings, in which.

DESCRIPTION OF EMBODIMENTS

As mentioned above, it may desirable that a mobile device is capable of determining its context automatically, and in a reliable manner. In order to facilitate this, a mobile device is provided as shown in FIG. 1, and a context determination method is conceived as shown in FIG. 2.

Figure 1:
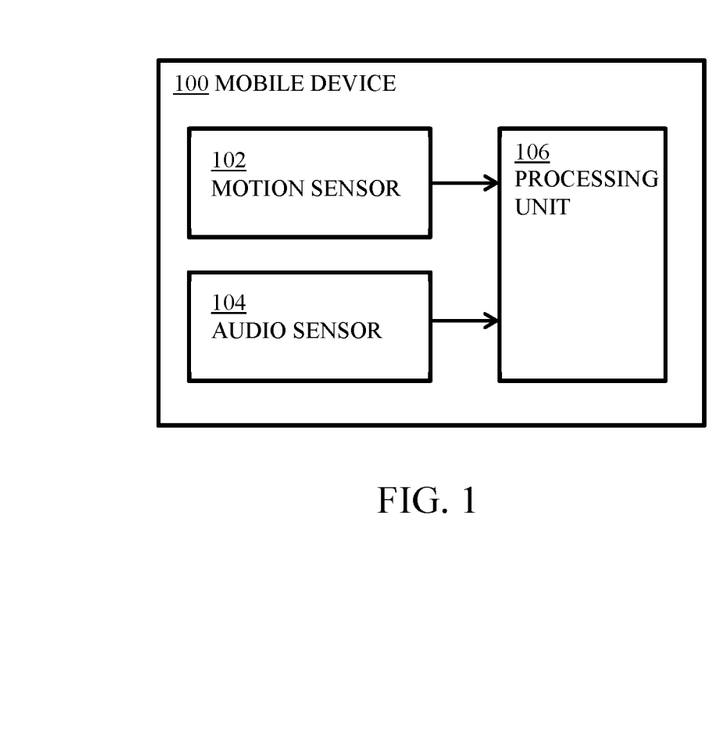
FIG. 1 shows an illustrative embodiment of a mobile device.

FIG. 1 shows an illustrative embodiment of a mobile device 100. The mobile device 100 contains a motion sensor 102 and an audio sensor 104. The audio sensor 104 may be a microphone, for example. The motion sensor 102 and the audio sensor 104 are operatively coupled to a processing unit 106. The motion sensor 102 is configured to detect one or more movements of the mobile device 100. Furthermore, the audio sensor 104 is configured to capture one or more audio signals. Furthermore, the processing unit 106 is configured to determine the context of the mobile device 100 in dependence on at least one movement of the mobile device 100 and at least one audio signal captured by the audio sensor 104. In this way, since both movements and audio signals are used for determining the context, the context may be determined in a reliable manner. For example, if only movements would be used, certain contexts might not be detected: if a car does not move but the engine is running, the device may not be able to detect that it is located within the car. Furthermore, motion sensors might not be able to differentiate between a car, a bus, a train, etc. On the other hand, music and wind might reduce the discriminative power of an audio signal. Thus, by determining the device's context in dependence on both movements and audio signals, i.e. in a synergistic manner, said context may be determined more accurately.

Figure 2:
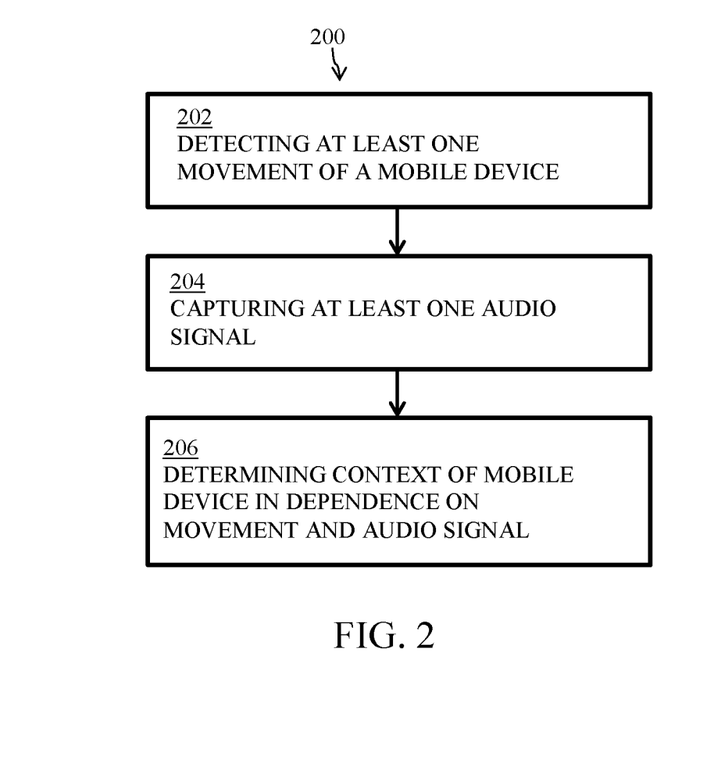
FIG. 2 shows an illustrative embodiment of a context determination method.

FIG. 2 shows an illustrative embodiment of a context determination method 200. In particular, a method 200 is shown for determining a context of a mobile device 100. The method 200 comprises, at 202, detecting, by a motion sensor 102 of the mobile device 100, at least one movement of the mobile device 100. Furthermore, the method comprises, at 204, capturing, by an audio sensor 104 of the mobile device 100, at least one audio signal. Furthermore, the method 200 comprises, at 206, determining, by a processing unit 106 of the mobile device 100, said context in dependence on the detected movement and the captured audio signal. As explained above, since both movements and audio signals are used for determining the context, the context may be determined in a reliable manner.

In one or more embodiments, the processing unit 106 is configured to use the captured audio signal for determining said context only if the detected movement indicates that said context is probable. In other words, the captured audio signal is used conditionally. In this way, power may be saved: an audio sensor (for example a microphone) often consumes more energy than a motion sensor, but it enables a more accurate determination of the context. The motion sensor 102, however, may be able to provide an indication that a certain context is likely. In that case, the audio sensor 104 may only be activated if the context is likely, such that it consumes energy only occasionally (for example, in case it should be confirmed that the device is located within the probable context). In a practical and efficient implementation, a classifier may be used for determining if a certain context is probable. In that case, the processing unit 106 is configured to classify the detected movement and to determine whether the context is probable using a result of the classification. For example, the processing unit 106 may be configured to use an activity classifier, which takes motion data as an input and outputs an indication of an activity of the mobile device (e.g., entering a car). The activity classifier may form an integral part of the processing unit, for example a software-implemented function stored in and executed by the processing unit 106. Alternatively, the activity classifier may be called by the processing unit 106 as a separate function that is stored elsewhere, for example.

In one or more embodiments, the processing unit is configured to use a machine-learning algorithm for determining the context. In particular, in contrast with a fully deterministic algorithm, a machine-learning algorithm may enable generalizations, i.e. determinations of specific contexts (e.g., specific cars) that have not been used during the training or enrollment of the processing unit 106. The machine-learning algorithm may be stored in and executed by the processing unit 106.

Figure 3:
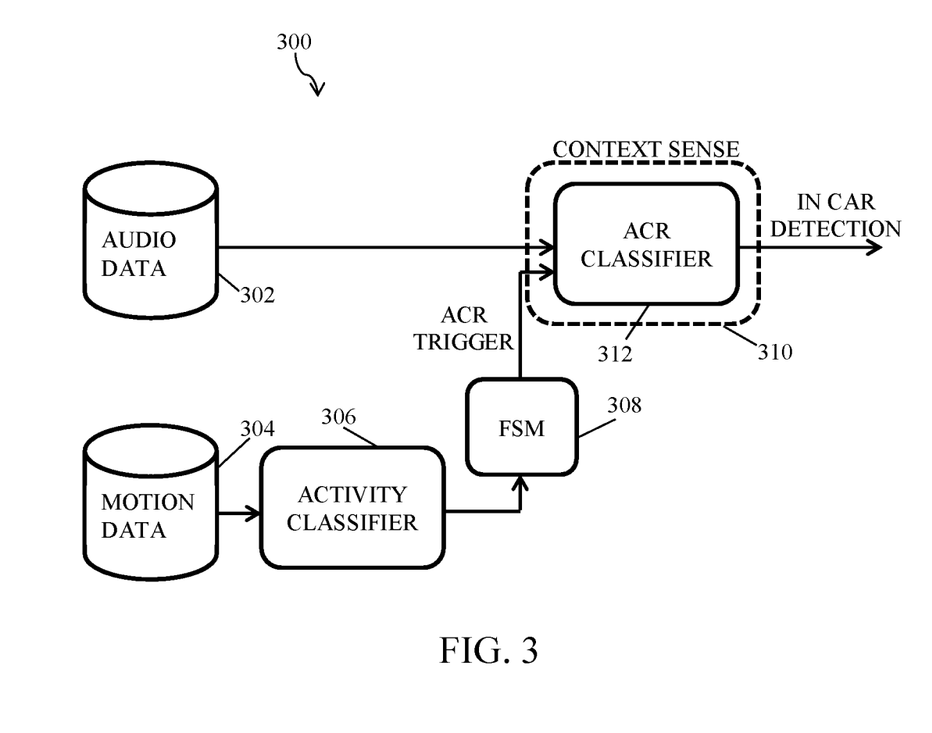
FIG. 3 shows an illustrative embodiment of a processing unit.

FIG. 3 shows an illustrative embodiment of a processing unit 300 of the kind set forth. The processing unit comprises an Acoustic Context Recognition (ACR) classifier that is configured to receive audio data 302 from a microphone (not shown). The audio data 302 may correspond to an audio signal captured by the microphone; the audio signal may have been transformed by suitable means (e.g., an analog-to-digital converter) into audio data 302 that can be input to the ACR classifier 312. The ACR classifier 312 forms part of a context sense block 310. Furthermore, the processing unit 300 comprises an activity classifier 306 that is configured to receive motion data 304 from a motion sensor (not shown). The motion data 304 may correspond to a movement detected by the motion sensor; the detected movement may have been transformed by suitable means (e.g., an analog-to-digital converter) into motion data 304 that can be input to the activity classifier 306. The motion data 304 are processed by the activity classifier 306, which outputs high-level motion information (e.g., standing still, walking, running, in-vehicle). Furthermore, the processing unit 300 comprises a Finite State Machine (FSM) 308 configured to analyze the high-level motion information (i.e., the "activity"). If the activity corresponds to an "entering a car" pattern (i.e., walking and then sitting down) then the FSM 308 may trigger activation of the microphone (not shown) and it may trigger the ACR classifier 312 to classify the audio data 302 received from the microphone. The ACR classifier 312 then analyzes the audio data 302 and outputs an "in-car" or "other" decision. Thus, in a practical and efficient implementation, the processing unit 300 is configured to use an FSM 308 for classifying the detected movement. The use of an FSM 308 as a trigger mechanism for the ACR classifier 312 may enable a reduction of incorrect positive decisions (i.e. false positives, for example an "in-car" decision while the device is not located in a car) as well as a reduction of the device's power consumption.

It is noted that, generally speaking, the different components of the processing unit 300 (i.e., the activity classifier 306, the FSM 308, the ACR classifier 312) may form an integral part of the processing unit 300. For example, these components may be software-implemented functions stored in, and executed by, the processing unit 300. Alternatively, these components may be called by the processing unit 300 as separate functions that are stored elsewhere, for example.

In one or more embodiments, the motion sensor includes at least one of: an accelerometer, a gyroscope, a compass, a barometer, a gravimeter. These types of motion sensors consume less power than a typical audio sensor. Thus, by using these types of motion sensors, and activating the audio sensor conditionally as explained above, a significant power reduction can be achieved, while it is still possible to determine the device's context with sufficient accuracy. For instance, in the embodiment shown in FIG. 3, the motion sensor or sensors may run in an always-on mode, while the microphone and the ACR classifier 312 may be triggered only in relevant zones (i.e., in good car environment candidates according to the activity classifier 306). Furthermore, as shown in FIG. 3, in a practical and efficient implementation, the processing unit 300 is configured to use an ACR classifier 312 for determining an acoustic portion of the context.

Figure 4:
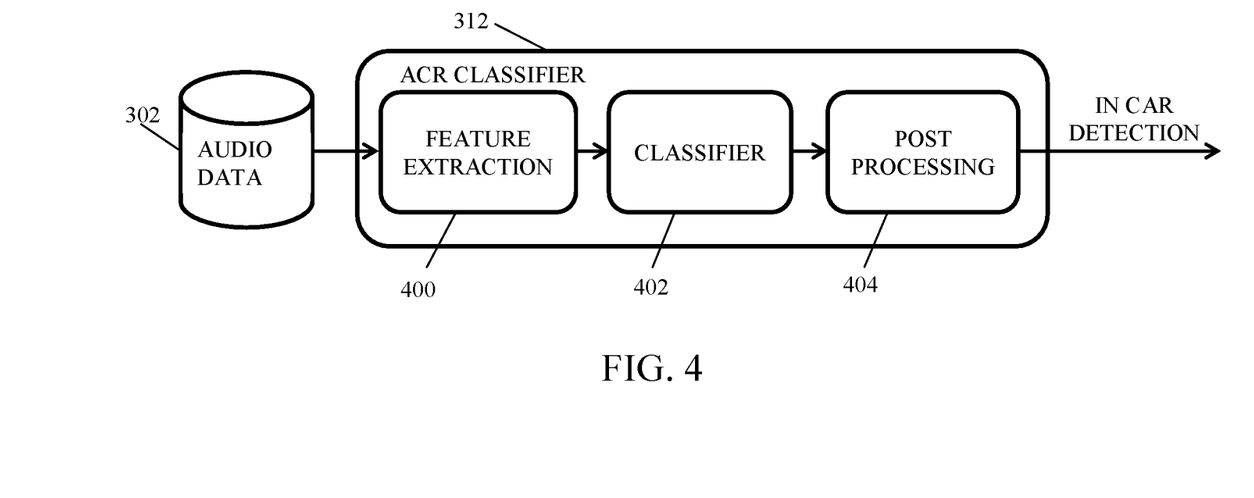
FIG. 4 shows an illustrative embodiment of an ACR classifier.

FIG. 4 shows an illustrative embodiment of an ACR classifier 312. The ACR classifier 400 comprises a feature extraction unit 400 configured to receive the audio data 302. Furthermore, the ACR classifier 312 comprises a stream classifier 402 operatively coupled to the feature extraction unit 400. Furthermore, the ACR classifier 312 comprises a post processing unit 404 operatively coupled to the classifier 402. In operation, the feature extraction unit 400 may extract meaningful features from Pulse Code Modulation (PCM) audio data. In this way, 13 Mel Frequency Cepstral Coefficients (MFCCs) may for example be computed each 10 milliseconds over 30-millisecond PCM windows. From these features, the stream classifier 402 may take a decision every 3 seconds: "in-car" or "other". Since 3 seconds of features result in 3,874 coefficients (298×13) to process, only the mean and the standard deviation of each coefficient along these 3 seconds are stored, which results in 26 coefficients (13×2). This compression of features enables a significant reduction of the computation cost.

The flow of every 3 seconds may then be post-processed by the post processing unit 404. The post-processing unit 404 may take into account past decisions and it may comfort a current decision trend. This may be important as it produces a more stable state ("in-car" or "other"), which in turn results a more reliable action-aid tool. The post-processing unit 404 may perform the following steps. First, a release timer may be applied: when detection should fall down it stays up during, for example, 6 seconds. That is to say, the release timer holds the detection by the classifier 402 during 6 s after its end. For instance, in case the classifier 402 detects an "in-car" context during 40 seconds, the final outcome (i.e., the output of the post-processing unit 404) will be a detection of 46 seconds. The release timer extends the detection duration, thereby providing a greater stability, but it is a blind process as it extends both correct and incorrect positive decisions. The idea is to hold the decision of the classifier 402, knowing a priori that the context will not change very quickly (e.g., a user cannot pass from an in-car context to another context every 20 seconds). Second, majority voting may be applied: if current decision A is different from 3 last decisions B then current decision is replaced by B. Thus the release timer weights "in-car" decisions, but as mentioned above it is a blind process thus it raises both the good detection rate and the false alarm rate. The good detection rate is defined as the number of correct positive decisions divided by the total number of decisions to be detected as positive. The false alarm rate is defined as the number of incorrect positive decisions divided by the total number of decisions to be detected as negative (i.e. as another context than "in-car"). Majority voting adds prior decisions to a current decision, so it smooths the decision flow but it introduces a high latency. By combining both steps in this order, the release timer drives majority voting smoothing towards a focus on "in-car" decisions.

Figure 5:
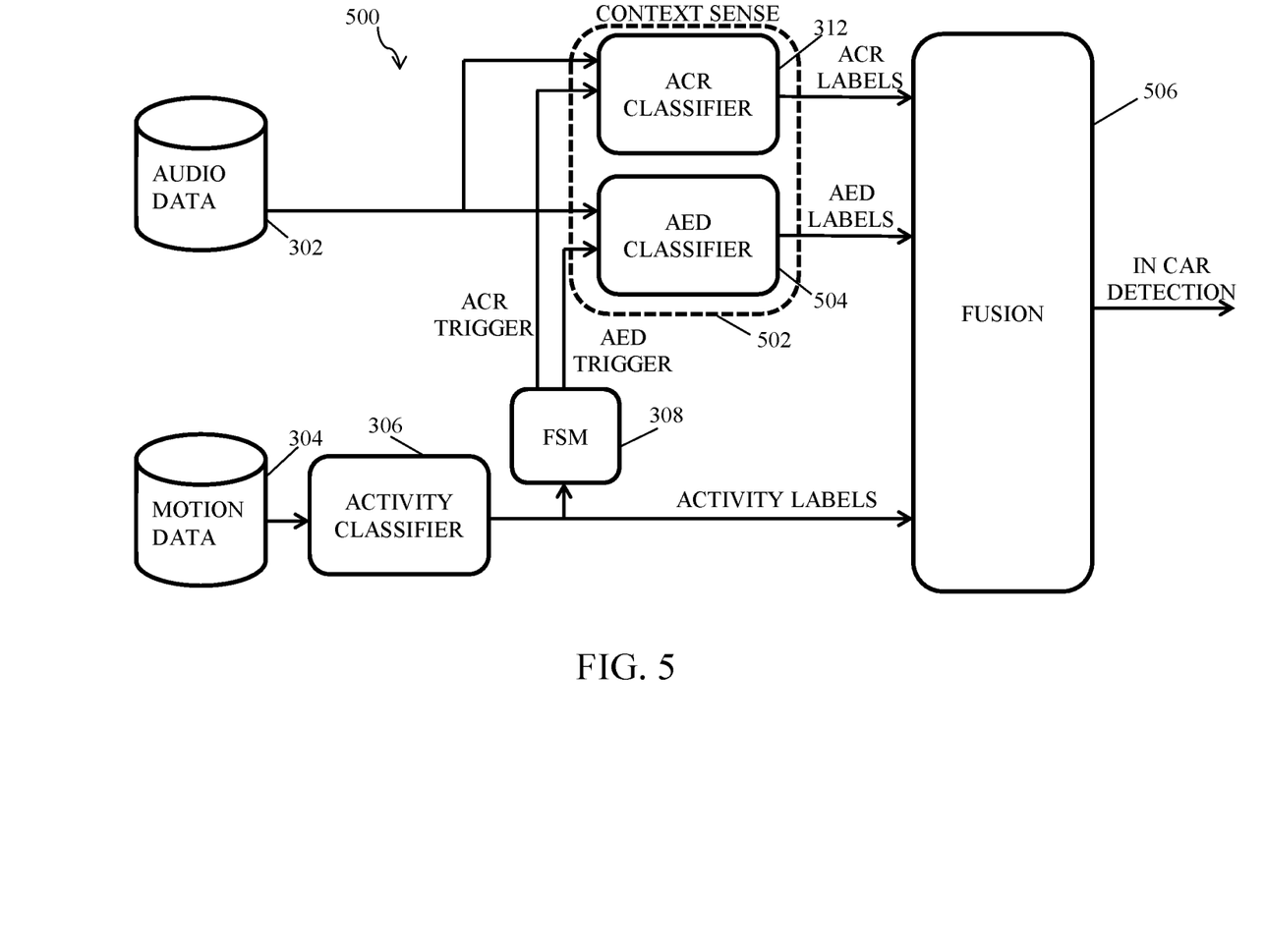
FIG. 5 shows another illustrative embodiment of a processing unit.

FIG. 5 shows another illustrative embodiment of a processing unit 500. The processing unit comprises, in addition to the components already shown in FIG. 3, an Audio Event Detection (AED) classifier 504 and a fusion block 506. In this embodiment, the FSM 308 is configured to trigger both the ACR classifier 312 and the AED classifier 504 to process the audio data 302. Triggering the ACR classifier 312 and the AED classifier 504 may be done concurrently. For instance, the AED classifier 312 can detect specific audio events that characterize an "entering a car" context (e.g., opening and closing a door, clicking of a seatbelt, starting an engine). Thus, in one or more embodiments, the processing unit 500 is configured to use an AED classifier 504 for determining an audio event that occurs in the context. Detecting such kind of events may facilitate a quick determination of the device's context. For example, the context "in-car" may be determined during an "entering a car" moment before driving.

Depending on the quality and the position of the microphone (not shown), audio events can be difficult to detect. However, since the classification results (i.e., classification decisions or "labels") output by the ACR classifier 312, the AED classifier 504 and the activity classifier 306 provide complementary information, fusing these results in a better final context determination (i.e., higher accuracy and lower latency). In particular, fusing refers to combining independently taken audio-based decisions and motion-based decisions in order to achieve a reliable "in-car" prediction. For instance, it may be learned that when the activity classifier outputs a positive "in-car" detection for longer than 1 minute and when concurrently the audio classifier outputs a positive "in-car" decision for a couple of seconds, there is probability of 80% that the mobile device is indeed located in a car. Thus, by combining audio-based and motion-based decisions it may be concluded that the mobile device is located within a car, while the audio-based and motion-based decision might not indicate that this is the case. Therefore, in one or more embodiments, the processing unit 500 is configured to classify the motion data (using activity classifier 306) and the audio data 302 (using ACR classifier 312 and AED classifier 504) independently from each other, and to merge the classification results in order to determine the context of the mobile device. Thereby, a quick yet accurate context determination may be achieved.

The above-described embodiments are directed at detecting the context of a vehicle, more specifically the context of a car. However, the skilled person will appreciate that the presently disclosed device and method are not limited to detecting these specific contexts. That is to say, the presently disclosed device and method may also be used to advantage when attempting to detect another context, such as a building. In particular, they may be used to advantage in any situation wherein a specific activity pattern (e.g. walking/stopping, idle/walking) combined with one or more specific audio signals characterize a certain environment. For example, when entering an office a particular activity pattern (walking/stopping) may occur together with office audio noise. Other contexts may involve entering a theater, a restaurant or a beach, for example. The activity classifier may be used only as an audio classifier trigger (so that power may be saved) or as an audio classifier trigger and as a motion classifier (so that power may be saved and complementary decisions may be taken).

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet, etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 mobile device
102 motion sensor
104 audio sensor
106 processing unit
200 context determination method
202 detecting at least one movement of a mobile device
204 capturing at least one audio signal
206 determining context of mobile device in dependence on movement and audio signal
300 processing unit
302 audio data
304 motion data
306 activity classifier
308 finite state machine
310 context sense
312 Acoustic Context Recognition (ACR) classifier
400 feature extraction
402 classifier
404 post processing
500 processing unit
502 context sense
504 Audio Event Detection (AED) classifier
506 fusion block

The invention claimed is:

1. A mobile device comprising:
a motion sensor configured to detect one or more movements of the mobile device;
an audio sensor configured to capture one or more audio signals;
a processing unit configured to determine a context of the mobile device in dependence on at least one movement detected by the motion sensor and at least one audio signal captured by the audio sensor;
wherein the processing unit is configured to activate the audio sensor for capturing the one or more audio signals for confirming said context only if the detected movement indicates that said context is probable.

2. The device of claim 1,
wherein the processing unit is configured to classify the detected movement and to determine whether said context is probable using a result of classifying the detected movement.

3. The device of claim 1,
wherein the processing unit is configured to use a machine-learning algorithm for determining the context.

4. The device of claim 1,
wherein the processing unit is configured to use a finite state machine for classifying the detected movement.

5. The device of claim 1
wherein the motion sensor includes at least one of: an accelerometer, a gyroscope, a compass, a barometer, a gravimeter.

6. The device of claim 1,
wherein the context comprises an acoustic portion, and
wherein the processing unit is configured to use an acoustic context classifier for determining the acoustic portion of the context.

7. The device of claim 1
wherein the processing unit is configured to use a voting processing over time for determining the most probable context.

8. The device of claim 1 wherein the processing unit is configured to use a release timer for avoiding a rapid switch between different contexts.

9. The device of claim 1 wherein the context comprises an audio event, and wherein the processing unit is configured to use an audio event detection classifier for determining said audio event.

10. The device of claim 1 wherein the context is a vehicle or a building.

11. The device of claim 1 wherein the processing unit is configured
to classify motion data and audio data independently from each other, and
to merge the classification results in order to determine the context.

12. A method for determining a context of a mobile device, comprising:
detecting, by a motion sensor of the mobile device, at least one movement of the mobile device;
capturing, by an audio sensor of the mobile device, at least one audio signal;
determining, by a processing unit of the mobile device, said context in dependence on the detected movement and the captured audio signal;
wherein the processing unit is configured to activate the audio sensor for capturing the at least one audio signal for confirming said context only if the detected movement indicates that said context is probable.

13. A computer program stored on a non-transitory machine-readable storage medium comprising executable instructions which, when executed, carry out or control the method of claim 12.

* * * * *